(12) United States Patent
Hoareau et al.

(10) Patent No.: US 10,071,803 B2
(45) Date of Patent: Sep. 11, 2018

(54) PACKAGE TRANSPORT CONTAINER AND TRANSPORT OPERATIONS FOR AN UNMANNED AERIAL VEHICLE

(71) Applicant: International Business Machines Corporation, Armonk, NY (US)

(72) Inventors: Guillaume Hoareau, Montpellier (FR); Johannes J. Liebenberg, Sandton (ZA); John G. Musial, Newburgh, NY (US); Todd R. Whitman, West Haven, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 799 days.

(21) Appl. No.: 14/598,338

(22) Filed: Jan. 16, 2015

(65) Prior Publication Data
US 2016/0207627 A1    Jul. 21, 2016

(51) Int. Cl.
| | | |
|---|---|---|
| G06F 15/02 | (2006.01) | |
| G07C 1/10 | (2006.01) | |
| B64D 1/02 | (2006.01) | |
| G06Q 10/08 | (2012.01) | |
| B64C 39/02 | (2006.01) | |

(52) U.S. Cl.
CPC .............. B64D 1/02 (2013.01); B64C 39/024 (2013.01); G06Q 10/0832 (2013.01); G06Q 10/0833 (2013.01); B64C 2201/027 (2013.01); B64C 2201/128 (2013.01); B64C 2201/141 (2013.01)

(58) Field of Classification Search
None
See application file for complete search history.

(56) References Cited

U.S. PATENT DOCUMENTS

| | | |
|---|---|---|
| 6,665,582 B1 | 12/2003 | Mortiz et al. |
| 7,002,472 B2 | 2/2006 | Stratmoen et al. |
| 7,394,361 B1 | 7/2008 | Twitchell, Jr. |
| 2014/0032034 A1 | 1/2014 | Raptopoulos et al. |

OTHER PUBLICATIONS

Lopez et al. "A middleware architecture for unmanned aircraft avionics." Proceedings of the 2007 ACM/IFIP/USENIX international conference on Middleware companion. ACM, 2007, 6 pages.
Yakimenko et al., "Autonomous Aerial Payload Delivery System "Blizzard"," 21st AIAA Aerodynamic Decelerator Systems Technology Conference and Seminar May 23-26, 2011, Dublin, Ireland, 11 pages.

*Primary Examiner* — Fateh M Obaid
(74) *Attorney, Agent, or Firm* — Cantor Colburn LLP

(57) ABSTRACT

According to an aspect, a package transport container for a UAV includes a manifest device having a computer processor, a receptacle including a base that secures contents of the receptacle, a locking mechanism that couples the manifest device to the receptacle during transport, and a connector coupling the manifest device to the UAV. The processor transmits material properties of the contents of the receptacle to the UAV, receives routing information for a package to be transported, monitors coordinates of the package transport container during transport, and upon determining the coordinates match coordinates of a delivery location specified in the routing information: sends a release request signal to the UAV to release the receptacle; receives a release command from the UAV; and disengages the locking mechanism to release the manifest device from the base. The routing information is determined at least in part based on the material properties of the contents.

20 Claims, 4 Drawing Sheets

PACKAGE TRANSPORT CONTAINER AND TRANSPORT OPERATIONS FOR AN UNMANNED AERIAL VEHICLE

BACKGROUND

The present disclosure relates generally to package transport services, and more specifically, to a package transport container and transport operations by an unmanned aerial vehicle (UAV).

UAVs, sometimes referred to as drones, are used for a variety of activities, such as surveying remote and/or expansive areas, e.g., power lines, pipelines, and wetlands, to name a few. More recently, the prospect of utilizing UAVs for distributing packages has been explored, e.g., in a commercial setting or to provide supplies or other needed items in support of non-commercial operations to areas that may be difficult to reach by other types of transportation. The ability to transport goods to consumers by UAVs offers great value, e.g., in terms of reducing traffic congestion associated with ground transport vehicles, as well as providing the ability to obtain access to areas in which delivery vehicles are limited (e.g., mountainous terrain, remote camping locations, crowded beaches, etc.).

SUMMARY

Embodiments include a package transport container for a UAV and a method and computer program product for implementing a package transport container operation for a UAV. The package transport container includes a manifest device having a computer processor, a package receptacle including an attachment base that is configured to secure contents of the package receptacle, a configurable locking mechanism that physically couples the manifest device to the package receptacle during a package transport operation and releases the package receptacle and the attachment base at a delivery location, and a connector that physically couples the manifest device to the UAV. The computer processor is configured to receive routing information for a package to be transported, monitor coordinates of the package transport container during a transport operation, and upon determining the coordinates match coordinates of the delivery location specified in the routing information, send a release request signal to the UAV to release the package receptacle, receive a release command from the UAV, and disengage the locking mechanism to release the manifest device from the attachment base.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments described herein can be utilized for package transport containers of unmanned aerial vehicles (UAVs). A package transport container includes a package receptacle configured to carry one or more packages as part of a transport operation. The package transport container also includes an intelligent manifest device that is physically coupled to the package receptacle in preparation of, and during execution of, a transport operation in which a package is picked up or loaded at one location and delivered to another location. The delivery can include multiple hops depending on the distance between the original pick up location and final delivery location. The intelligent manifest device is configured to be released from the package receptacle portion of the package transport container at the time of package delivery and remains coupled with the UAV that transports the package. The intelligent manifest includes components for tracking the contents of the package receptacle, communicating information to the UAV or other network entity, and initiating recovery operations in the event of a delivery failure event. The package transport container can accommodate any UAV that shares a common set of communication protocols.

The manifest device has a display panel and is attached to the receptacle, such that information stored therein is capable of being viewed without having to access the package receptacle portion of the container.

In one embodiment, the package transport containers can be implemented by an entity that provides goods and services to consumers. Alternatively, the package transport containers may be implemented by a third-party service provider that provides the package transport services as an intermediary between the seller entity and the consumers. In another embodiment, the package transport containers may be implemented by a non-commercial entity, e.g., for situations in which packages (such as food or medical supplies) need to be transferred between locations as part of an emergency condition where first responders are unable to gain access to various roads or locations. For purposes of illustration, the package transport containers and services are described herein with respect to a commerce application.

Figure 1:
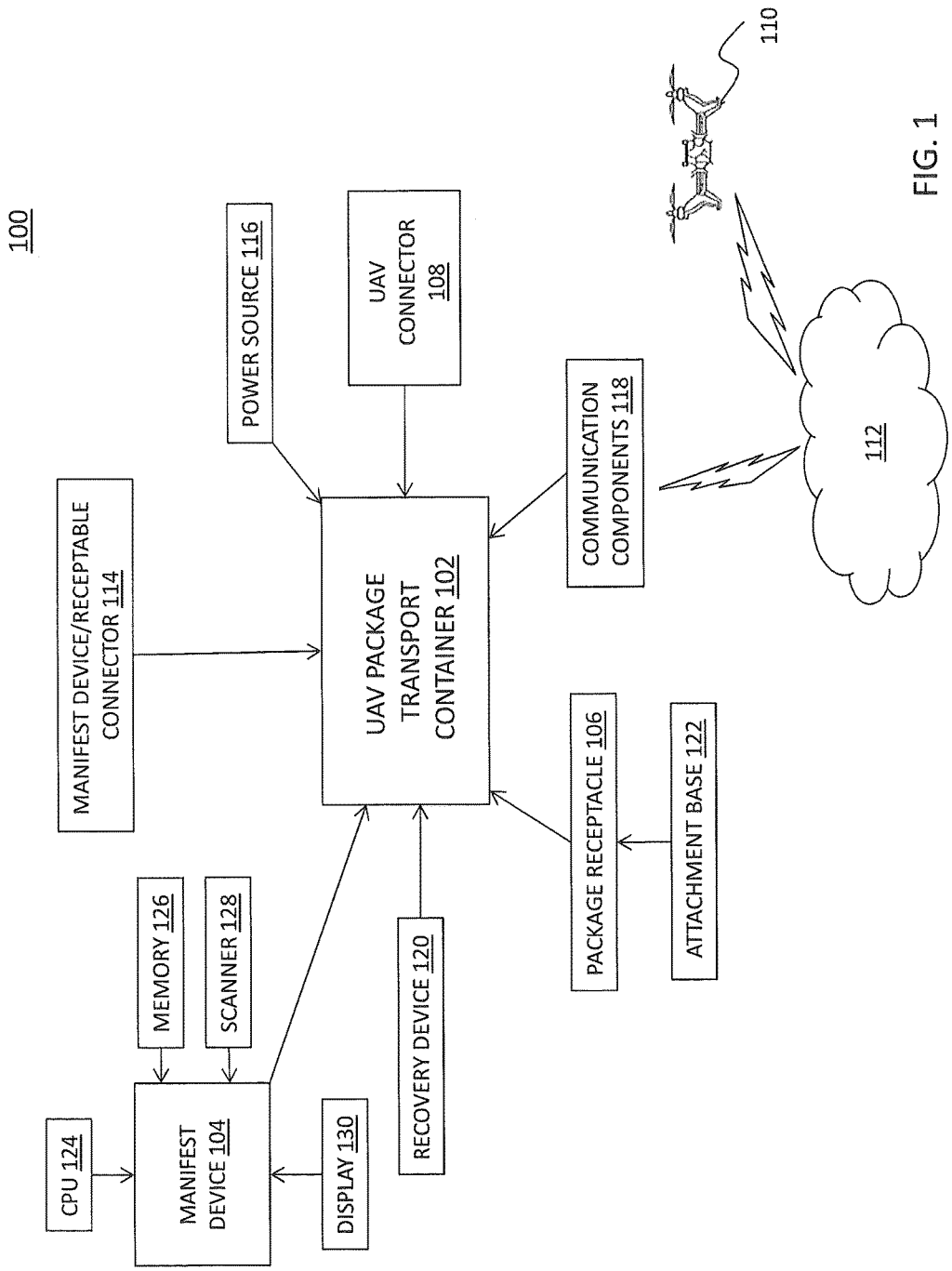
FIG. 1 depicts a block diagram of a system for implementing package transport operations for a UAV in accordance with an embodiment.

Turning now to FIG. 1, a high level view of a system 100 for performing the package transport operations is generally shown in accordance with an embodiment. The system 100 includes a package transport container 102, a UAV 110, and network(s) 112.

The UAV 110 refers to an unmanned aircraft whose flights are autonomously controlled through onboard computer systems. In an embodiment, a portion of the flight control may be implemented remotely through interaction with a ground station (not shown). The UAV 110 includes physical components and related circuitry configured to pick up, carry, and drop off packages. In an embodiment, the UAV 110 is electrically powered and is configured to be electrically rechargeable.

The networks 112 may be any type of known networks including, but not limited to, a wide area network (WAN), a local area network (LAN), a global network (e.g. Internet), a virtual private network (VPN), and an intranet. The networks 112 may be implemented using wireless networks or any kind of physical network implementation known in the art, e.g., using cellular, satellite, and/or terrestrial network technologies. The networks 112 may also include short range wireless networks utilizing, e.g., BLUETOOTH™ and WI-FI™ technologies and protocols. In one embodiment, the package transport container 102 communicates with the UAV 110 over a short-range wireless network. In another embodiment, the package transport container 102 communicates with other network entities over a long-range network (e.g., satellite or cellular).

The UAV shipping container 102 includes a manifest device 104 and a package receptacle 106. In an embodiment, the manifest device 104, in turn, includes a computer processor (CPU) 124, memory 126, scanner 128, and display 130. The computer processor 124 executes logic, e.g., stored in the memory 126, for implementing the package transport functions described herein. The memory 126 stores routing information for a transport operation (e.g., geographical coordinates of a delivery location and, optionally, any hubs en route to the delivery location). The memory 126 may also store a network address of the package transport container 102. In addition, the memory 126 may store a transport activity log of the deliveries performed in which the manifest device 104 was present, even when the deliveries are made by different UAVs.

The memory 126 may also store package information of items transported using the manifest device 104. For example, package information can be item identifiers or product codes, product descriptors, product cost, buyer's billing information, seller information, package return instructions, etc. In an embodiment, the memory 126 may also store product materials that are known to be associated with any safety or health risk (e.g., flammable materials). In this embodiment, the manifest device 104 may display the materials or any symbols representing the materials or risks on the display 130 of the manifest device 104.

In another embodiment, the memory device 126 stores recovery information and history. For example, if a package delivery failure event has been determined (e.g., due to inclement weather in which a transport operation is aborted or the package transport container is compromised, or a network failure in which routing and delivery activities are disrupted, etc.), the recovery information can be retrieved to determine a desired course of action, which is then initiated by the manifest device 104.

The scanner 128 may be a UPC reader, QR code reader, or other device that scans, e.g., using RFID communication, information about a package item to be transported.

The display 130 may be implemented using a light-emitting diode (LED) array, liquid crystal display (LCD), plasma, or other type of display.

The package receptacle 106 may be a fixed dimension containment device (e.g., rectangular or square) or may be made of a flexible mesh or netting material. The flexible mesh material can include a two-way or four-way stretch fabric, such as LYCRA. The flexible material enables packages of widely varying sizes and shapes to be accommodated by the package transport container 102. In an embodiment, the package receptacle 106 may be disposable (e.g., one time use), or may be configured to be re-usable.

The package receptacle 106 includes an attachment base 122 that is configured to secure the contents of the package receptacle 106. The attachment base 122 is removably fixed to the package receptacle 106. In an embodiment, the attachment base 122 is configured to be substantially planar in shape.

The manifest device 104 is removably secured to the attachment base 122 via a manifest connector 114, which may be any type of fixing means, e.g., electromagnetics, electronics, or electro-mechanical components. In an embodiment, the manifest device 104 contains the locking mechanism and is activated in response to wireless commands, as will be described further herein.

The package transport container 102 further includes a UAV connector 108, which may comprise one or more cables that affix the manifest device 104 to the UAV 110.

The package transport container 102 also includes communication components 118. The communication components 118 may receive communications from the UAV 110 or other network entity over one or more of the networks 112 (e.g., as part of a recovery operation). The communications may include instructions associated with package transport operations.

The communication components 118 may include wireless and wireline components, hardware (e.g., transmitters and receivers), as well as related circuitry to enable the communications. The communication components 118 may include an antenna configured to send and receive communications with respect to the UAV 110 over a short-range network (e.g., BLUETOOTH).

In an embodiment, the package transport container 102 also includes a power source 116.

In a further embodiment, the package transport container 102 further includes one or more recovery devices 120. The recovery devices 120 may include one or more of a flotation device, an airbag, and a parachute, each of which is activated in response to a recovery operation signal from the manifest device 104.

Figure 2:
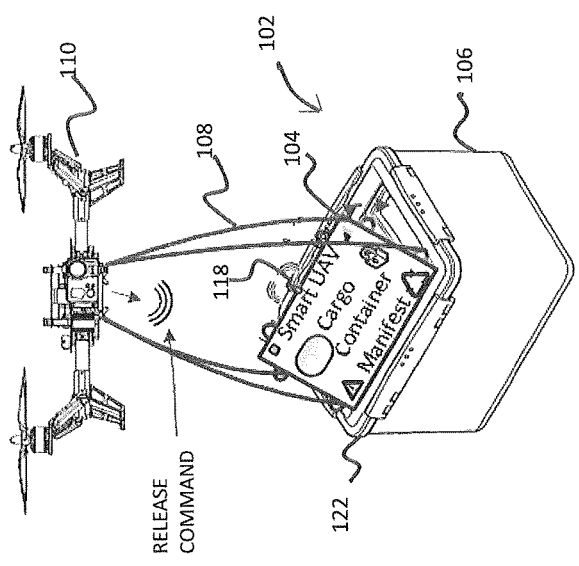
FIG. 2 depicts a perspective view of a UAV and package transport container in accordance with an embodiment.

Turning now to FIG. 2, a perspective view of the package transport container 102 will now be described. The package transport container 102 of FIG. 2 is shown to be in a release state (i.e., in the process of a disengagement of the manifest device 104 from the package receptacle 106. The package receptacle 106 is a fixed dimension receptacle and the attachment base 122 is configured to correspond to the dimensions of the receptacle 106. The UAV connector 108, which may be rigid or flexible, is physically coupled to the UAV 110 at a first end thereof, and to the manifest device 104 at a second, and opposing, end thereof. In an embodiment, the manifest device 104 is removably connected to the attachment base 122. As shown in FIG. 2, the display 130 is shown on a first surface of the manifest device 104, and a second surface of the manifest device 104, which is parallel to the first surface, is coupled to the attachment base 122. The first surface of the manifest device 104, when engaged with the attachment base 122, faces upward toward the UAV 110. The first surface also includes at least a portion of the communication components 118, such that wireless connectivity can be realized between the manifest device 104 and the UAV 110.

Figure 3:
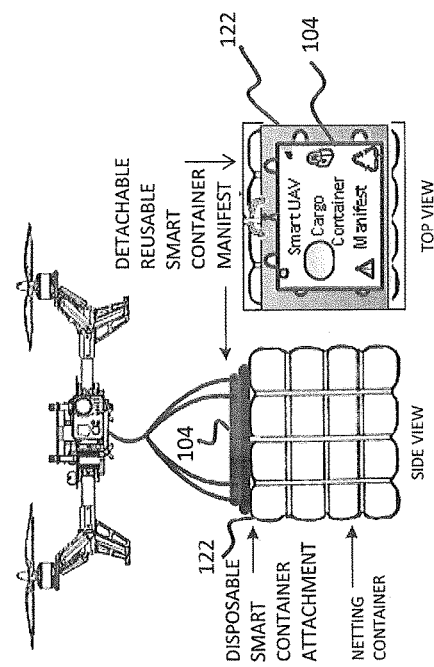
FIG. 3 depicts a side view and top view, respectively, of the package transport container in accordance with an embodiment.

In FIG. 3, the package receptacle 106 is made of flexible mesh material with reinforced fibers distributed throughout to secure packages of varying weight. The manifest device 104 is shown to lie flat on an upper surface of the attachment base 122.

Figure 4:
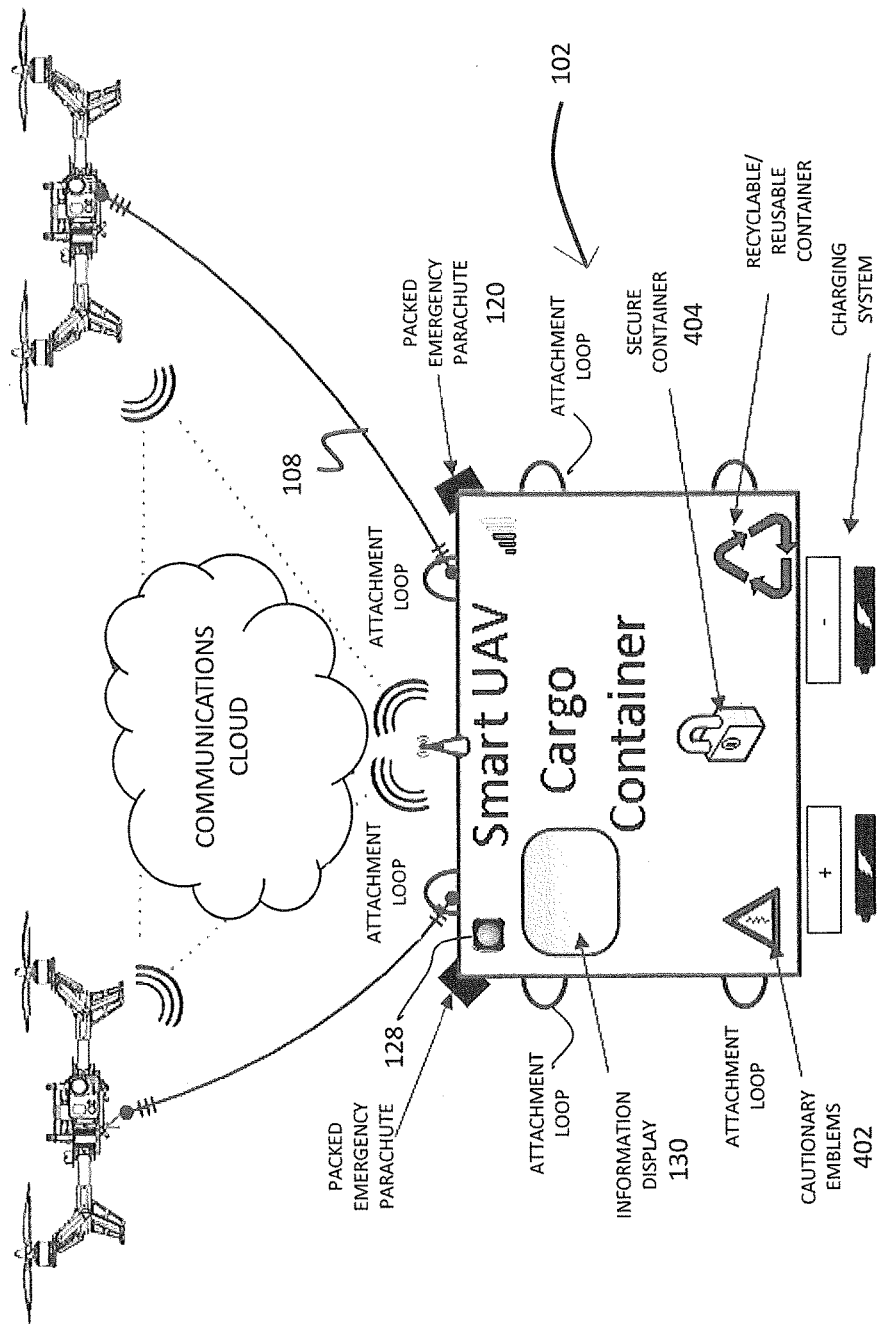
FIG. 4 depicts a package transport container in accordance with an embodiment.

Turning now to FIG. 4, a further embodiment of the package transport container 102 is shown. A top view of the manifest device 104 illustrates some of the features associated with the package transport container 102. The features may include recovery devices 120, which may be parachutes that are packed and stored in the manifest device 104. The display 130 may provide any information, e.g., information retrieved from the memory 126. As shown in FIG. 4, cautionary symbols 402 may be provided on the top surface of the manifest device 104 to reflect the materials contained therein. Alternatively, the display 130 may electronically convey these symbols if desired. For example, package information such as package handling instructions, based on package materials from which the package is made, can be displayed electronically on the display 130 of the manifest device 104. In an embodiment, the manifest device 104 may also show an indicator 404 that the container 102 is secured (e.g., subject to an access or authentication scheme before the contents can be retrieved). In addition, in the embodiment shown in FIG. 4, the UAV connector 108 includes an attachment loop that is affixed to the manifest device 104. The UAV connector 108 connects the UAV to the manifest device 104 via the attachment loop.

Figure 5:
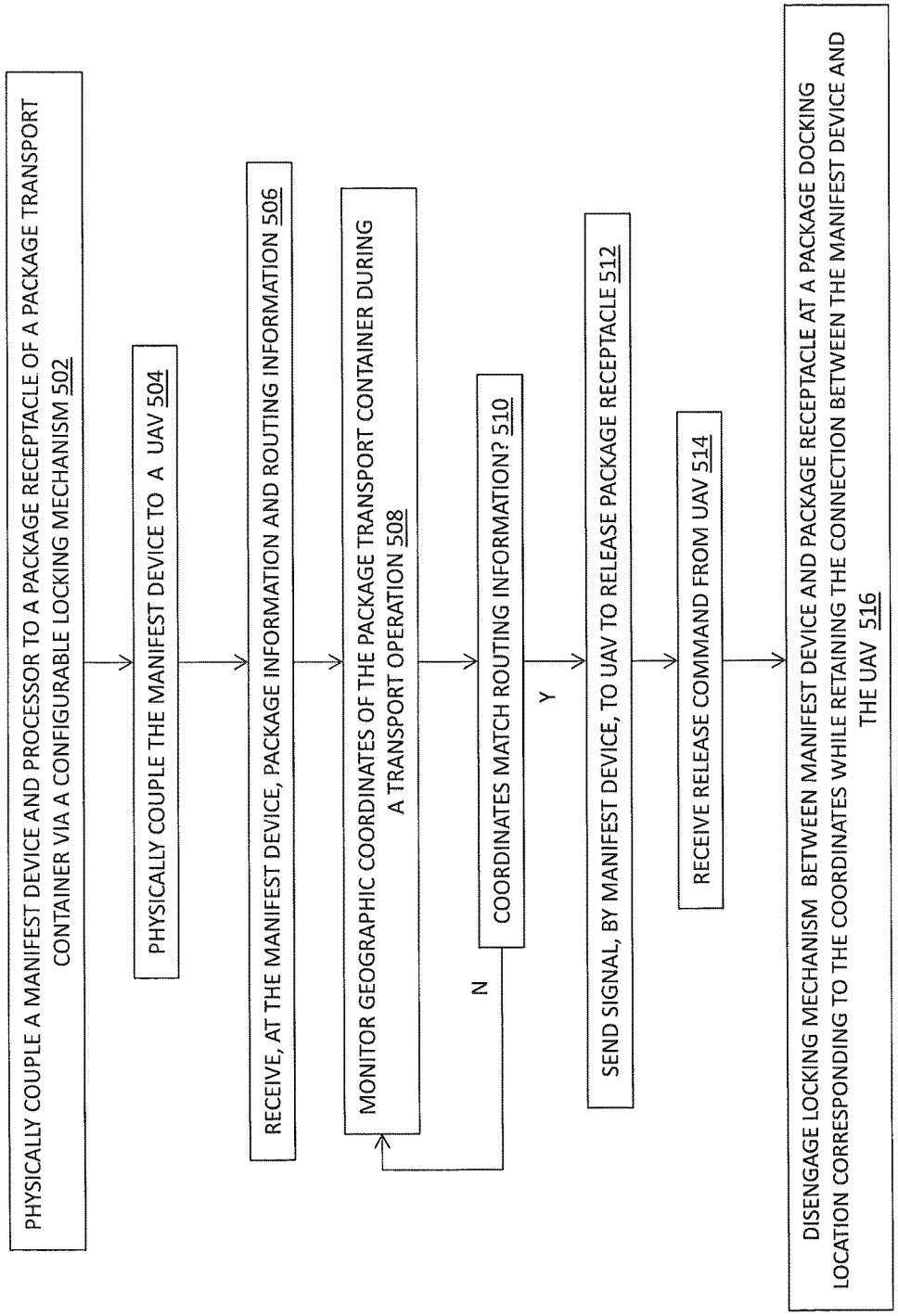
FIG. 5 depicts a flow diagram of a process for implementing package transport container operations in accordance with an embodiment.

Turning now to FIG. 5, a flow diagram of a process for implementing a transport operation using the package transport container 102 will now be described in an embodiment. At block 502, the manifest device 104 is physically coupled to the package receptacle 106 via a configurable locking mechanism 114. The package receptacle 106 includes the attachment base 122, which secures the contents of the package receptacle 106.

At block 504, the manifest device 104 is physically coupled to the UAV 102 via the UAV connector 108.

At block 506, the computer processor 124 of the manifest device 104 receives package information and routing information for a package to be transported.

At block 508, the computer processor 124, via the communication components 118 (e.g., a GPS), monitors the geographic coordinates of the package transport container 102 during a transport operation.

At block 510, the computer processor 124 determines whether the coordinates match the coordinates associated a delivery location of the routing information. If not, the computer processor 124 continues to monitor the location of the container 102 during transport.

Upon determining the coordinates match the coordinates of the delivery location specified in the routing information, the computer processor 124 sends a release request signal to the UAV 110 to release the package receptacle 106 at block 512, receives a release command from the UAV 110 at block 514, and disengages the locking mechanism 114 to release the manifest device 104 from the attachment base 122 at block 516.

As indicated above, the manifest device 104 may store a network address of the container 102 in the memory 126. In an embodiment, the computer processor 124 is configured to determine an occurrence of a delivery failure event, and transmit the network address, current coordinates, and a recovery operation request, via the communication components 118, to a network entity. The package transport container 102 can be tracked via the network address and current coordinates. In an embodiment, when the delivery failure event is determined, the computer processor 124 may activate the recovery device 120 on the package transport container 102.

As indicated above, the manifest device 104 may also include a scanner 128 configured to scan package information from the package at packing loading time, and store the package information in the memory 126.

Technical effects and benefits of the package transport container and transport operations include an intelligent manifest device that monitors package information, routing information, and recovery operations. The manifest device is coupled to a package receptacle that holds the packages during transport, and the manifest device remains with the UAV upon successful delivery of the package. The manifest device is also physically, but removably, coupled to the package receptacle such that detachment of the manifest device is achieved once the delivery is complete. The manifest device has a display panel and is attached to the receptacle such that information stored therein is capable of being viewed without having to access the package receptacle portion of the container.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A package transport container for a UAV, comprising:
   a manifest device including a computer processor, the manifest device wirelessly coupled to the UAV;
   a package receptacle including an attachment base that is configured to secure contents of the package receptacle;
   a configurable locking mechanism that physically couples the manifest device to the package receptacle during a package transport operation and releases the package receptacle and the attachment base at a delivery location;
   a connector that physically couples the manifest device to the UAV;
   wherein the computer processor is configured to:
   transmit material properties of the contents of the package receptacle to the UAV;
   receive routing information for a package to be transported, the routing information determined at least in part based on the material properties of the contents;
   monitor and transmit active coordinates of the package transport container during a transport operation;
   upon determining the coordinates match coordinates of the delivery location specified in the routing information:
   sending a release request signal to the UAV to release the package receptacle;
   receiving a release command from the UAV; and
   disengaging the locking mechanism to release the manifest device from the attachment base.

2. The package transport container of claim 1, wherein the manifest device further includes a communication interface and a memory storing a network address of the package transport container, the computer processor configured to:
   determine an occurrence of a delivery failure event;

transmit the network address, current coordinates, and a recovery operation request, via the communication interface, to a network entity, the package transport container trackable via the network address and current coordinates.

3. The package transport container of claim 2, wherein the computer processor is configured to, upon the occurrence of the delivery failure event, activate a recovery device on the package transport container, the recovery device comprising at least one of a parachute, airbag, and floatation device.

4. The package transport container of claim 1, wherein the manifest device further comprises:
   a memory; and
   a scanner configured to scan package information from the package at packing loading time, the package information stored in the memory.

5. The package transport container of claim 4, wherein the manifest device further comprises a display panel on an upper surface of the manifest device;
   wherein the package information includes package handling information based on package materials from which the package is made, and the computer processor is configured to:
   display on the display panel at least one of the package handling information and the package materials.

6. The package transport container of claim 1, wherein the package receptacle is formed of a flexible mesh material configured to accommodate varying shapes and sizes of packages.

7. The package transport container of claim 1, wherein the package receptacle is configured to have fixed dimensions.

8. A method for implementing a package transport container operation for a UAV, the method comprising:
   transmitting, by a computer processor of a manifest device, material properties of contents of a package receptacle to the UAV;
   receiving, at the computer processor of the manifest device, routing information for a package to be transported, the routing information determined at least in part based on the material properties of the contents, the manifest device physically coupled to the package receptacle via a configurable locking mechanism, the package receptacle including an attachment base that is configured to secure the contents of the package receptacle, wherein the manifest device is physically coupled to the UAV;
   monitoring and transmitting, by the computer processor, active coordinates of the package transport container during a transport operation;
   upon determining the coordinates match coordinates of a delivery location specified in the routing information:
   sending a release request signal to the UAV to release the package receptacle;
   receiving a release command from the UAV; and
   disengaging the locking mechanism to release the manifest device from the attachment base.

9. The method of claim 8, wherein the manifest device further includes a communication interface and a memory storing a network address of the package transport container, the method further comprising:
   determining, by the computer processor, an occurrence of a delivery failure event;
   transmitting the network address, current coordinates, and a recovery operation request, via the communication interface, to a network entity, the package transport container trackable via the network address and current coordinates.

10. The method of claim 9, further comprising, upon the occurrence of the delivery failure event, activating a recovery device on the package transport container, the recovery device comprising at least one of a parachute, airbag, and flotation device.

11. The method of claim 8, wherein the manifest device further comprises:
   a memory; and
   a scanner configured to scan package information from the package at packing loading time, the package information stored in the memory.

12. The method of claim 11, wherein the manifest device further comprises a display panel on an upper surface of the manifest device;
   wherein the package information includes package handling information based on package materials from which the package is made, and method further comprises:
   displaying on the display panel at least one of the package handling information and the package materials.

13. The method of claim 8, wherein the package receptacle is formed of a flexible mesh material configured to accommodate varying shapes and sizes of packages.

14. The method of claim 8, wherein the package receptacle is configured to have fixed dimensions.

15. A computer program product comprising:
   a tangible storage medium readable by processing circuits of a package transport container for a UAV and storing instructions for execution by the processing circuits to perform a method, comprising:
   transmitting, by a manifest device, material properties of contents of a package receptacle to the UAV;
   receiving, at the manifest device, routing information for a package to be transported, the routing information determined at least in part based on the material properties of the contents, the manifest device physically coupled to a package receptacle via a configurable locking mechanism, the package receptacle including an attachment base that is configured to secure contents of the package receptacle, wherein the manifest device is physically coupled to the UAV;
   monitoring and transmitting active coordinates of the package transport container during a transport operation;
   upon determining the coordinates match coordinates of a delivery location specified in the routing information:
   sending a release request signal to the UAV to release the package receptacle;
   receiving a release command from the UAV; and
   disengaging the locking mechanism to release the manifest device from the attachment base.

16. The computer program product of claim 15, wherein the manifest device further includes a communication interface and a memory storing a network address of the package transport container, the processing circuits further configured to perform:
   determining an occurrence of a delivery failure event;
   transmitting the network address, current coordinates, and a recovery operation request, via the communication interface, to a network entity, the package transport container trackable via the network address and current coordinates.

17. The computer program product of claim 16, wherein the processing circuits are further configured to perform:
   upon the occurrence of the delivery failure event, activating a recovery device on the package transport container, the recovery device comprising at least one of a parachute, airbag, and flotation device.

18. The computer program product of claim 15, wherein the manifest device further comprises a memory and a scanner, the scanner configured to scan package information from the package at packing loading time, the package information stored in the memory.

19. The computer program product of claim 18, wherein the manifest device further comprises a display panel on an upper surface of the manifest device;
   wherein the package information includes package handling information based on package materials from which the package is made, and processing circuits are further configured to perform:
   displaying on the display panel at least one of the package handling information and the package materials.

20. The computer program product of claim 15, wherein the package receptacle is formed of a flexible mesh material configured to accommodate varying shapes and sizes of packages.

* * * * *